Sept. 29, 1959 — L. A. RUNTON ET AL — 2,906,569
BALL JOINT ACTUATOR
Filed July 1, 1957
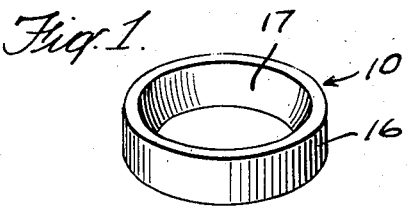
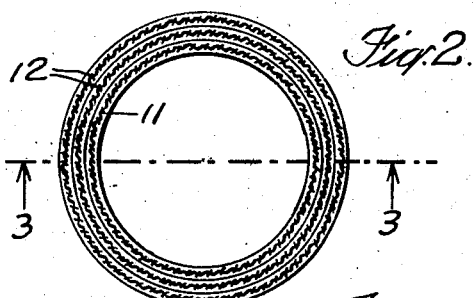
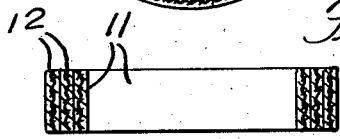
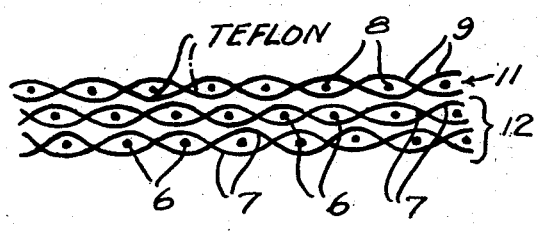
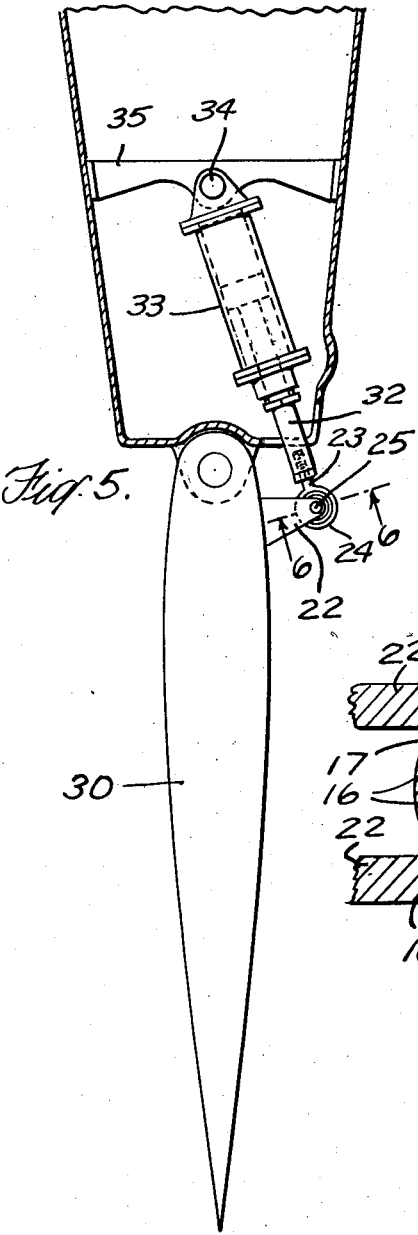
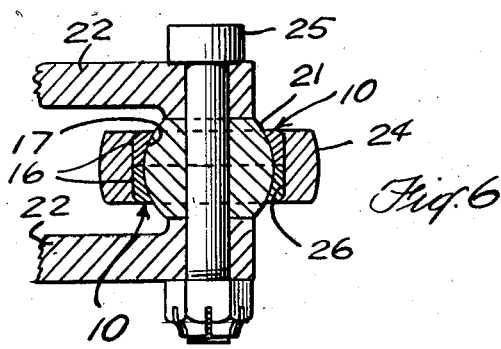
INVENTORS
LESLIE A. RUNTON
HENRY C. MORTON
BY
ATTORNEY

United States Patent Office 2,906,569
Patented Sept. 29, 1959

---

2,906,569

BALL JOINT ACTUATOR

Leslie A. Runton, Middle Haddam, and Henry C. Morton, Branford, Conn., assignors to The Russell Manufacturing Company, Middletown, Conn., a corporation of Connecticut Application July 1, 1957, Serial No. 669,055

1 Claim. (Cl. 308—72)

This invention relates to anti-friction bearings and more particularly to self-lubricating bearings for universal joints for control linkages or the like.

An object is to provide a self-lubricating bearing of the above type which is suited for use in control linkages for airplanes, for example for controlling the rudder or other air foil surfaces.

Another object is to provide a bearing of the above type which is light in weight and dependable in operation.

Various other objects and advantages will be apparent as the nature of the invention is more fully disclosed.

Airplanes have many moving parts which must be actuated and controlled by mechanical linkages having universal joints. For example, the trim tab is actuated by the air stream flowing over the wing of the plane and is connected by a swivel linkage to a hydraulic control which, in turn, controls the oil flow to other mechanical assemblies that actually move the main ailerons and rudders of the plane. These controls which connect parts moving in various planes, are subjected to heavy loads and must be interconnected in a manner that produces a frictionless motion without backlash to prevent vibration or flutter which at high speeds could destroy the trim tab.

There are so many of these parts on a plane today and they are so inaccessible that the question of lubricating them is very difficult.

In accordance with the present invention a woven fabric containing Teflon, a tetrafluoroethylene, is used for the antifriction surface. Teflon yarn has a low coefficient of friction and dimensional stability (no cold flow) under pressure. However, Teflon will not bond to impregnants. Hence special means must be adopted to affix the Teflon to the bearing surface.

In the present case the Teflon yarn is woven into a fabric sleeve, preferably with the Teflon extending around the sleeve as a filler and woven with warp yarns of a high heat resistance and capable of bonding to an impregnant. The Teflon sleeve is plied with one or more backing sleeves composed of a fabric which is capable of bonding to an impregnant. The assembly is then impregnated with a bonding resin such as a phenolic resin and cured under heat and pressure to form a ring having the desired cross section. This ring is assembled in the universal joint and secured in place by bonding the fabric backing to one linkage element with the Teflon surface in contact with the other element to constitute the bearing surface.

The specific nature of the invention will be better understood from the following description, taken in connection with the accompanying drawing in which one embodiment has been shown for purposes of illustration.

In the drawing:

Fig. 1 is a perspective view of a bearing ring embodying the invention;

Fig. 2 is a detail view of the fabric ring before curing under heat and pressure;

Fig. 3 is a section taken on the line 3—3 of Fig. 2;

Fig. 4 is a diagrammatic view illustrating the composition of the fabric;

Fig. 5 is a detail view on a smaller scale illustrating the use of the bearing in a control linkage for an airplane rudder; and Fig. 6 is a section taken on the line 6—6 of Fig. 5 but on a much larger scale showing the construction of the joint.

Referring to the drawing more in detail the bearing ring 10 (Fig. 1) is composed of an inner ply 11 (Figs. 2 to 4) of woven fabric web having Teflon multifilament warp yarns 9 running circumferentially and filler yarns 8 composed of cotton, spun Dacron, nylon, Orlon, linen, jute, or the like, or other material capable of bonding to an impregnant. The web 11 may be composed of a section of a seamless tube or sleeve or a strip wound around a core into cylindrical form.

At least two backing plies 12 of woven fabric, either in strip form or in the form of seamless tubes are disposed around the Teflon ply 11. The plies 12 may be composed of warp yarns 7 and filler yarns 6 of the same material as filler yarns 8 above noted. If the plies 11 and 12 are composed of strip material the joints are staggered for strength.

The ply 11 may be of a single or multiple ply construction and contain varying amounts of Teflon yarn from 15% to 100% on the operating surface. The laminated fabric may be impregnated with a high strength phenolic bonding resin derived from the reaction product of phenol, cresol or a homologue with formaldehyde under controlled conditions. The treated base is carefully heated to remove the solvent and the resin content polymerized until a residual volatile content of 5% to 7% is attained.

After assembly of the treated fabric into a preform, the impregnated ring is placed in a mold and molded under heat and pressure into the desired finished form. The conversion of the resin into a thermoset form may be accomplished at a temperature of 300° F. to 350° F. for from thirty to sixty minutes at pressures of 10 tons to 100 tons depending upon the area of the object being molded.

The finished bearing ring 10 is shown in Fig. 1 as having a cylindrical outer surface 16 and a segmental spherical inner surface 17. Other contours may be formed according to the end use of the bearing.

The bonding resin is not capable of bonding to the Teflon yarn. However, it bonds to the filler yarns 8 and to the yarns 6 and 7 of the inner plies to form a rigidly bonded unit wherein the Teflon is held in place mechanically.

Since the Teflon yarn is held in position both mechanically and by bonding, it will not deform or "creep" under heavy pressures thus greatly extending the useful life of the actuator mechanisms. In addition the Teflon yarn, being chemically inert, remains unchanged in composition under severe adverse condition of operation.

For low temperature applications the yarns 6, 7 and 8 may be composed of cotton or the like for economy. For high temperature applications these yarns may be composed of spun Dacron, which is capable of withstanding relatively high temperatures. Nylon, Orlon or the like may be used in applications wherein a high tensile strength is required or where their other characteristics render them particularly suitable.

In Fig. 6 an inner bearing member 20 having a spherical surface 21 is secured in arms 22 of a link 23. A ring 24 carrying a coupling pin 25 has a dished cylindrical inner surface 26 in which is secured a pair of actuator rings 10 made as above described. The actuator rings 10 may be pressed into place in the ring member 24 and secured by a bonding adhesive so as to exert pressure on the sperical surface 21 of the inner member 20. The Teflon yarn on the inner surface of the ply 11 of the actuator ring 10 is held in pressure contact with the spherical surface 21 and forms a self-lubricating frictionless bearing for the ring member 24.

The coupling member is shown in Fig. 5 as forming a part of a control linkage for an airplane rudder 30. The pin 25 of the ring member 24 is connected to the arms 22 attached to the rudder 30. The link 23 is connected to a piston rod 32 connected to a piston operating in a hydraulic cylinder 33 having the usual fluid connections for control purposes. The cylinder 33 is pivoted at 34 to the frame 35 forming a part of the tail of the airplane.

Obviously the bearing and coupling linkage may be applied to the control of other airplane surfaces or for other uses as will be apparent to a person skilled in the art.

What is claimed is:

A ball and socket universal joint comprising an outer socket member and an inner ball member having a spherical outer surface and a ring bearing member having an outer surface bonded to said socket member and having an inner spherical surface contacting and forming a bearing for said spherical surface of said ball member, said bearing ring being composed of an inner ply and at least two backing plies all joined together solely by a cured thermoset bonding resin, said inner ply being composed of multifilament Teflon warp yarn extending circumferentially of said ply and filler yarn of a resin bondable material, and said backing plies being composed of warp yarns and filler yarns of a resin bondable material, said Teflon yarn being exposed on the inner surface of the bearing ring to constitute the bearing surface and being secured by said filler yarn of resin bondable material and seated in the bonding resin.

References Cited in the file of this patent

UNITED STATES PATENTS 2,804,886    White ---------------- Sept. 3, 1957